US010365677B2

(12) United States Patent
Tokunaga et al.

(10) Patent No.: US 10,365,677 B2
(45) Date of Patent: Jul. 30, 2019

(54) POWER MANAGEMENT SYSTEM, POWER MANAGEMENT METHOD, AND COMPUTER PROGRAM

(71) Applicant: Panasonic Intellectual Property Management Co., Ltd., Osaka (JP)

(72) Inventors: Yoshihiko Tokunaga, Hyogo (JP); Seiichi Miyazaki, Osaka (JP); Naohiro Fukuda, Chiba (JP); Hiroyuki Kuriyama, Kanagawa (JP); Norimasa Ota, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 172 days.

(21) Appl. No.: 15/025,444

(22) PCT Filed: Sep. 18, 2014

(86) PCT No.: PCT/JP2014/004798
§ 371 (c)(1),
(2) Date: Mar. 28, 2016

(87) PCT Pub. No.: WO2015/045337
PCT Pub. Date: Apr. 2, 2015

(65) Prior Publication Data
US 2016/0216722 A1    Jul. 28, 2016

(30) Foreign Application Priority Data
Sep. 30, 2013   (JP) .................... 2013-205076

(51) Int. Cl.
*G05D 3/12* (2006.01)
*G05D 5/00* (2006.01)
(Continued)

(52) U.S. Cl.
CPC ............... *G05F 1/66* (2013.01); *G05B 15/02* (2013.01); *G06Q 30/0201* (2013.01);
(Continued)

(58) Field of Classification Search
CPC .... G06Q 50/06; G06Q 30/0201; G05B 15/02; G05F 1/66; H02J 3/008; H02J 3/32; Y04S 50/10; Y04S 50/14
See application file for complete search history.

(56) References Cited

U.S. PATENT DOCUMENTS

2007/0276547 A1* 11/2007 Miller .................. G06Q 50/06
                                                        700/295
2010/0005730 A1*  1/2010 Weng .................... F24F 5/0017
                                                        52/1
(Continued)

FOREIGN PATENT DOCUMENTS

EP    2 485 189 A1    8/2012
EP    2665149 A1     11/2013
(Continued)

OTHER PUBLICATIONS

Extended European Search Report dated Aug. 8, 2016 issued in European Patent Application No. 14849053.5.
(Continued)

*Primary Examiner* — Zhipeng Wang
(74) *Attorney, Agent, or Firm* — McDermott Will & Emery LLP

(57) ABSTRACT

A power management system includes a receiver, an estimator, an administrator and a determiner. The receiver acquires DR information that includes a reduction value and a target period for requesting a reduction of received power. The estimator estimates, as first power information, power that is consumed by an electric load during the target period. The administrator manages, as second power information,
(Continued)

power that can be output from a power supplying apparatus including a power storage apparatus. The determiner determines that a condition for participating in a power trade market is met, when determining that the reduction value is achievable during the target period, based on the first power information and the second power information.

8 Claims, 4 Drawing Sheets

(51) Int. Cl.
    *G05D 9/00*     (2006.01)
    *G05D 11/00*     (2006.01)
    *G05D 17/00*     (2006.01)
    *G05F 1/66*     (2006.01)
    *G06Q 50/06*     (2012.01)
    *G05B 15/02*     (2006.01)
    *G06Q 30/02*     (2012.01)
    *H02J 3/32*     (2006.01)
    *H02J 3/00*     (2006.01)

(52) U.S. Cl.
    CPC .............. *G06Q 50/06* (2013.01); *H02J 3/008* (2013.01); *H02J 3/32* (2013.01); *Y04S 50/10* (2013.01); *Y04S 50/14* (2013.01)

(56) References Cited

U.S. PATENT DOCUMENTS

| | | | | |
|---|---|---|---|---|
| 2011/0046806 A1* | 2/2011 | Nagel | ................... | H04L 67/125 700/291 |
| 2011/0140667 A1* | 6/2011 | Moon | ....................... | H02J 3/32 320/134 |
| 2011/0184574 A1* | 7/2011 | Le Roux | ................. | G01D 4/004 700/291 |
| 2012/0136496 A1 | 5/2012 | Black et al. | | |
| 2012/0179596 A1* | 7/2012 | Mitsumoto | ............ | G06Q 40/04 705/37 |
| 2012/0233060 A1* | 9/2012 | Terano | .................... | G06Q 30/06 705/37 |
| 2012/0306271 A1* | 12/2012 | Kuriyama | ................. | H02J 9/00 307/23 |
| 2013/0015708 A1* | 1/2013 | Ukita | ........................ | H02J 3/32 307/43 |
| 2013/0218356 A1* | 8/2013 | Lee | ......................... | G06Q 50/06 700/291 |
| 2014/0236368 A1* | 8/2014 | Iwata | ..................... | G05B 15/02 700/287 |
| 2014/0277769 A1* | 9/2014 | Matsuoka | ................ | F24F 11/30 700/278 |
| 2014/0336837 A1* | 11/2014 | Kiuchi | ................... | G05B 15/02 700/295 |

FOREIGN PATENT DOCUMENTS

| | | |
|---|---|---|
| JP | 2002-369385 A | 12/2002 |
| JP | 2011-234570 A | 11/2011 |
| JP | 2012-118982 A | 6/2012 |
| JP | 2012-147546 A | 8/2012 |
| JP | 2012-165513 A | 8/2012 |
| JP | 5138110 B1 | 2/2013 |
| JP | 2013-066268 A | 4/2013 |

OTHER PUBLICATIONS

International Search Report issued in Application No. PCT/JP2014/004798 dated Dec. 16, 2014, with English translation.

* cited by examiner

FIG. 4A

| UNIT PRICE (YEN) | 7.00 or less | 7.00 -7.50 | 7.50 -8.10 | 8.10 -8.50 | 8.50 -9.00 | 9.00 or more |
|---|---|---|---|---|---|---|
| AMOUNT OF POWER (1000kWh) | 28 | 22 | 13 | 7 | 5 | 0 |

FIG. 4B

| UNIT PRICE (YEN) | 7.00 or less | 7.00 -7.20 | 7.20 -9.00 | 9.00 or more |
|---|---|---|---|---|
| AMOUNT OF POWER (1000kWh) | 0 | 7 | 12 | 25 |

POWER MANAGEMENT SYSTEM, POWER MANAGEMENT METHOD, AND COMPUTER PROGRAM

RELATED APPLICATIONS

This application is the U.S. National Phase under 35 U.S.C. § 371 of International Application No. PCT/JP2014/004798, filed on Sep. 18, 2014, which in turn claims the benefit of Japanese Application No. 2013-205076, filed on Sep. 30, 2013, the disclosures of which are incorporated by reference herein.

TECHNICAL FIELD

The invention relates generally to power management systems, power management methods and computer programs and, more particularly, to a power management system configured to manage electric power that is output from a power storage apparatus, a power management method for the power management system, and a computer program for realizing the power management system.

BACKGROUND ART

There has been recently provided a power storage apparatus to be used in a consumer's facility. Furthermore, there has been also proposed an energy management system that is capable of obtaining a price by a negotiated trade with an electric power provider, or a trade of an electric power adjusting reservation capacity in a power market, as a adjusting reservation capacity for a demand response (see e.g., JP 2012-165513 A (hereinafter referred to as "Document 1")).

Document 1 discloses a technique for generating a reduction schedule for facilities of consumers to meet the power consumption reduction amount, using a generated power amount of a power generation apparatus, a discharged power amount of a power storage apparatus and the like.

Incidentally, in a consumer's facility, a cost at introduction of a power storage apparatus capable of supplying power to an electric load is high. The high cost is a factor in a hindrance to spreading a power storage apparatus. With the technique disclosed in Document 1, the price can be obtained by meeting a request of the demand response, but it is necessarily impossible to provide a sufficient motivation for promoting spread of a power storage apparatus.

DISCLOSURE OF THE INVENTION

It is an object of the present invention to provide a power management system, which can provide a motivation for promoting use of a power storage apparatus, and further provide a power management method for the power management system, and a computer program for realizing the power management system.

A power management system according to an aspect of the present invention includes: a receiver configured to acquire DR information that includes a reduction value and at a target period for requesting a reduction of received power; an estimator configured to estimate, as first power information, power that is consumed by an electric load during the target period; an administrator configured to manage, as second power information, power that can be output from a power supplying apparatus including a power storage apparatus; and a determiner configured to determine that a condition for participating in a power trade market is met, when determining that the reduction value is achievable during the target period, based on the first power information and the second power information.

A power management method according to an aspect of the present invention includes: acquiring, with a receiver, DR information that includes a reduction value and a target period for requesting a reduction of received power; estimating, with an estimator, as first power information, power that is consumed by an electric load during the target period; determining, with a determiner, that a condition for participating in a power trade market is met, when determining that the reduction value is achievable during the target period, based on the first power information.

A computer program according to an aspect of the present invention is to cause a computer to function as the above-mentioned power management system. Also, the aspect of the present invention is not limited to the computer program, and may be a computer-readable storage medium that stores the computer program.

According to the configuration of the aspects of the present invention, when a reduction of power that is received by a consumer's facility is requested, it is possible to use power of the power storage apparatus in order to reduce power during the target period, and further offer a trade of the remaining power of the power storage apparatus at an end point of the target period to the power trade market. For this reason, power to be traded in the power trade market can be supplied from the power storage apparatus, while using the power storage apparatus in order to contribute to the reduction of the received power through the DR information. Accordingly, profit to a consumer can be increased by introduction of a power storage apparatus.

BRIEF DESCRIPTION OF THE DRAWINGS

Preferred embodiments of the invention will now be described in further details. Other features and advantages of the invention will become better understood with regard to the following detailed description and accompanying drawings where:

FIGS. 4A and 4B are diagrams illustrating examples of a power trade according to Embodiment 1.

DESCRIPTION OF EMBODIMENTS (Outline)

Figure 1:
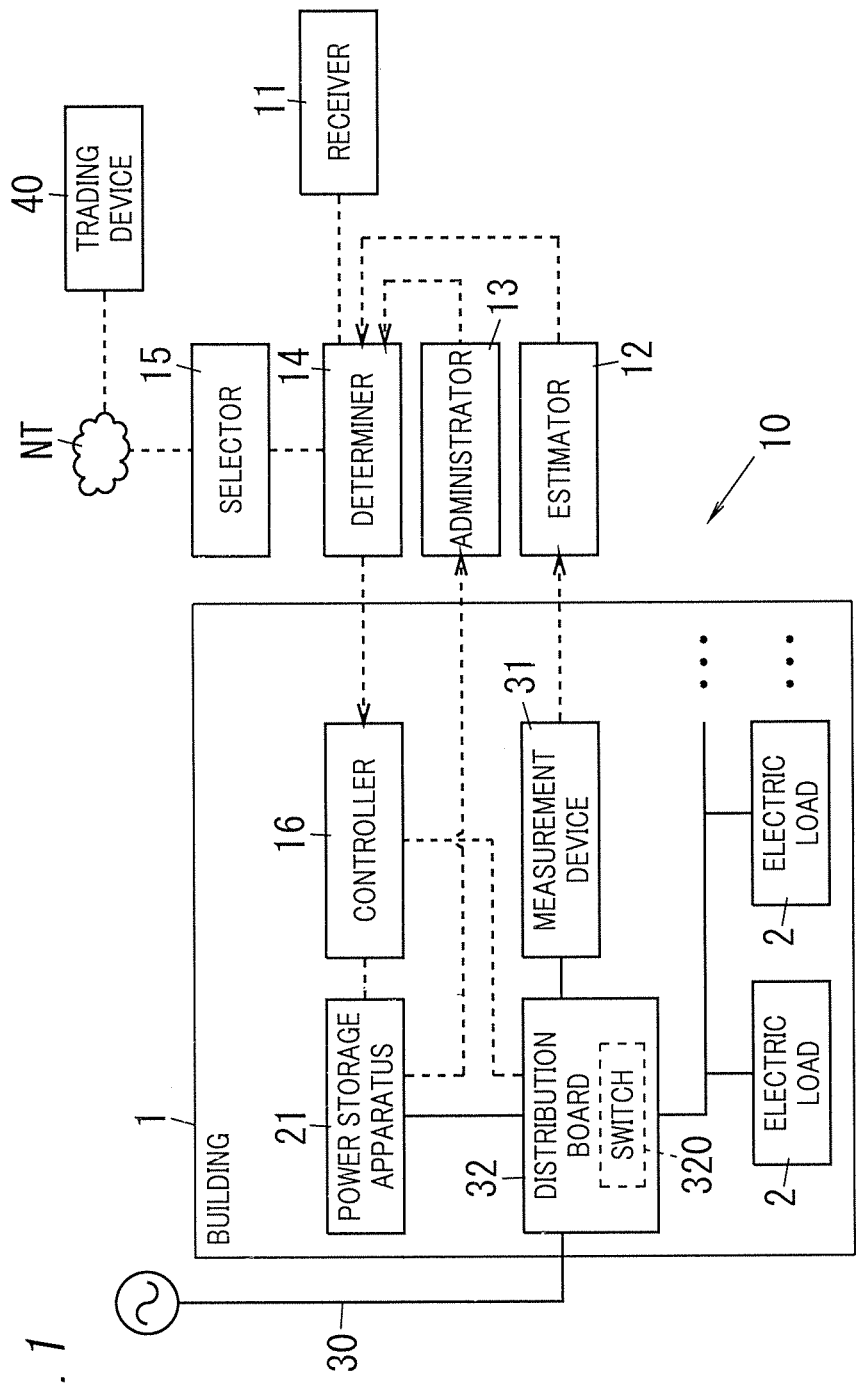
FIG. 1 is a block diagram illustrating Embodiment 1.

As shown in FIG. 1, a power management system 10 described below includes a receiver 11, an estimator 12, an administrator 13, and a determiner 14. The receiver 11 is configured to acquire DR (Demand Response) information that includes a reduction value and a target period for requesting a reduction of received power. The estimator 12 is configured to estimate, as first power information, power that is consumed by an electric load(s) 2 during the target period. The administrator 13 is configured to manage, as second power information, power that can be output from a power supplying apparatus 20 including a power storage apparatus 21. The determiner 14 is configured to determine that a condition for participating in a power trade market is met, when determining that the reduction value is achievable during the target period, based on the first power information and the second power information.

The administrator 13 is preferably configured to manage, as the second power information, a residual capacity of the power storage apparatus 21. In this case, the determiner 14 is preferably configured to set, to an object for a power trade in the power trade market, power obtained by subtracting power corresponding to the first power information from power corresponding to the second power information, when determining that the reduction value is achievable during the target period.

In addition, the administrator 13 may be configured to estimate, before the target period, a residual capacity of the power storage apparatus 21 at a start point of the target period, as the second power information. The determiner 14 may be configured to estimate a residual capacity of the power storage apparatus 21 at an end point of the target period, on an assumption that the reduction value is achieved during the target period, based on the first power information and the second power information. When the residual capacity estimated exceeds a reference value, the determiner 14 is preferably configured to set, to the object for the power trade, power by which the power corresponding to the second power information exceeds the reference value.

Figure 5:
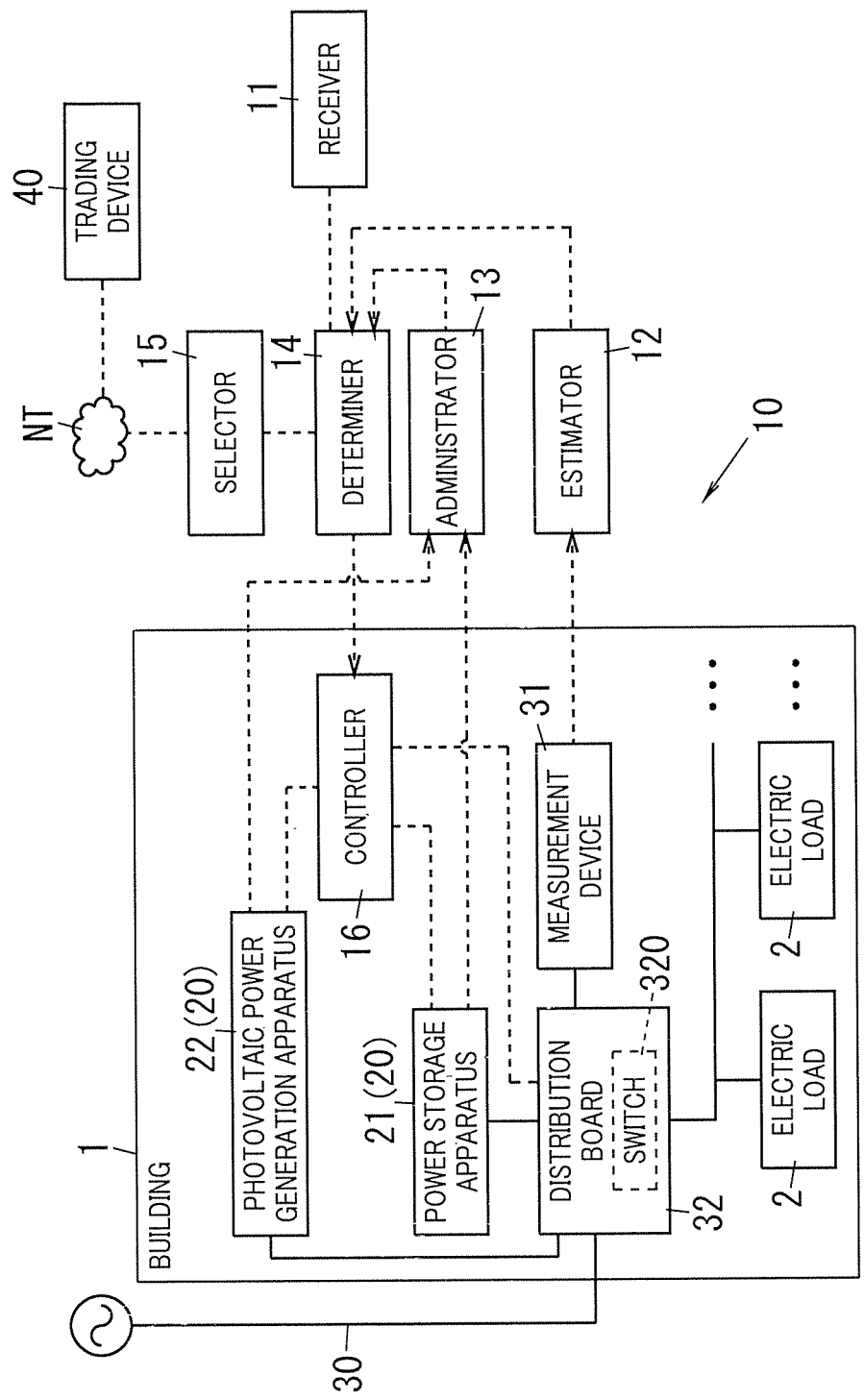
FIG. 5 is a block diagram illustrating Embodiment 2.

As shown in FIG. 5, the power supplying apparatus 20 preferably includes a power generation apparatus (photovoltaic power generation apparatus 22) that generates power using natural energy and supplies, to the electric load 2, generated power prior to power output from the power storage apparatus 21. In this case, the second power information that is managed by the administrator 13 preferably includes power that is generated during the target period by the power generation apparatus.

Furthermore, the administrator 13 is preferably configured to manage, before the target period, a total of a residual capacity of the power storage apparatus 21 at a start point of the target period and an amount of power that is generated during the target period by the power generation apparatus (photovoltaic power generation apparatus 22), as the second power information. The determiner 14 is configured to estimate a residual capacity of the power storage apparatus 21 at an end point of the target period, on an assumption that the reduction value is achieved during the target period, based on the first power information and the second power information. When the residual capacity estimated exceeds a reference value, the determiner 14 is preferably configured to set, to the object for the power trade, power by which the power corresponding to the second power information exceeds the reference value.

A power management method described below includes three steps. A first step is to acquire, with a receiver 11, DR information that includes a reduction value and a target period for requesting a reduction of received power. A second step is to estimate, with an estimator 12, as first power information, power that is consumed by an electric load 2 during the target period. A third step is to determine, with a determiner 14, that a condition for participating in a power trade market is met, when determining that the reduction value is achievable during the target period, based on the first power information.

A computer program described below is to cause a computer to function as the power management system 10. The computer program may be provided through a telecommunication network such as the Internet, or a computer-readable storage medium. Also, a trading device 40 described below is constituted by, for example, a web-server operated by an electric utility or a cloud computing system.

Accordingly, the power management system 10 includes, as a main hardware element, a processor that operates according to a program. A configuration of this type of processor is not limited, and may be e.g., a microcontroller formed integrally with a memory, a configuration separately from a memory, or a configuration where two more processors are cooperated.

In embodiments described below, the power storage apparatus 21 is installed in a consumer's building 1 (disposed within the building 1 or around the building 1), as shown in FIG. 1. The power storage apparatus 21 includes a storage battery, and a power converter for performing charging and discharging of the storage battery. The photovoltaic power generation apparatus 22 with a solar cell may be installed within the consumer's building 1 or around it, as shown in FIG. 5. In the case where only the power storage apparatus 21 is installed, the storage battery in the power storage apparatus 21 is charged with power received from a power grid 30. In the case where the photovoltaic power generation apparatus 22 is installed in addition to the power storage apparatus 21, the storage battery in the power age apparatus 21 is charged with not only power received from the power grid 30 but also power generated by the photovoltaic power generation apparatus 22.

Power that is output from the power storage apparatus 21 is supplied to one or more electric loads 2 installed within the consumer's building 1 or around it, or to the power grid 30. Power generated by the power generation apparatus 22 is supplied to one or more electric loads 2 installed within the consumer's building 1 or around it, or to the power grid 30, or used for charging of the power storage apparatus 21. The supply destination of power by the power storage apparatus 21 and the photovoltaic power generation apparatus 22 is determined under various conditions described below.

The power storage apparatus 21 may be of an installed-type that is installed at a fixed position of the consumer's building 1 or a portable-type. Alternatively, a storage battery for travelling that is mounted in an electric vehicle (such as an electric car or a plug-in hybrid car) may be used as the power storage apparatus 21. The power converter of the power storage apparatus 21 converts DC power output from the storage battery into AC power equivalent to AC power that is received from the power grid 30. Instead of the storage battery, the power storage apparatus 21 may include a capacitor having a high-capacitance, or be configured to convert electric power into another form of energy and store it. The photovoltaic power generation apparatus 22 may be replaced with another power generation apparatus using energy such as wind, hydro or geothermal energy, as long as it has a configuration of converting natural energy into electric power.

It is assumed that the building 1 is a hospital, a hotel, a factory or the like. In addition, the below described technique can be applied even to a case where spaces for consumers exist in the building 1, such as a condominium, an office building or a commercial building, if the whole building's power is managed collectively. For example, a distribution board may be provided in each consumer's space, and further a principal distribution board for distributing power to the whole building may be provided in a building manager room, an electric room or the like. Also, in a building that is adapted for collectively receiving power at high voltage, an electricity meter for collectively receiving power at high voltage is provided as a measurement device. In this case therefore, it is possible to measure the total power received by the building. Furthermore, the below described technique can be applied even to detached houses as buildings 1 of consumers in a region, if the buildings 1 can be managed collectively as one aggregate and there is an electricity aggregator that collectively manages power of the respective power storage apparatuses 21 installed in the buildings 1.

When a consumer's building 1 is a hospital, a hotel, a factory, a condominium, an office building, a commercial building or the like, a power storage apparatus 21 therein has a capacitance of 100 kWh or more. Alternatively, a power storage apparatus 21 having a capacitance that exceeds 1000 kWh may be installed. Also, when detached houses exist in a region and share a single power storage apparatus 21, the single power storage apparatus 21 may have a large capacitance.

When buildings 1 of consumers in one aggregate share a single power storage apparatus 21, desirably, there exists a service provider that collectively manages the buildings 1 of the consumers such that an electric utility that supplies power to the buildings 1 of the consumers through the power grid 30 can regard the buildings 1 of the consumers in the aggregate collectively, as one building 1. This kind of service provider supplies various services to the buildings 1 of the consumers in the aggregate on behalf of the electric utility that performs a power generation business. As an example of this kind of service provider, a demand response service provider including an electricity aggregator is considered.

The electric utility may be an electricity utility selected from a general electricity utility (so-called power company), an independent power producer, a specified electricity utility, a power producer and supplier and the like. Alternatively, the electric utility may be a service provider that does not perform a power generation business, but does purchase power from another company and sell the purchased power to consumers.

Note that, when a consumer's building 1 is a detached house, a power storage apparatus 21 therein has a capacitance in a range of approximately 1 to 10 kWh. The below described technique can be applied even to such a small-scale power storage apparatus 21, as long as a power trade is allowed to be conducted.

Embodiment 1

In this embodiment, as shown in FIG. 1, a case will be described, where two or more electric loads 2 (two in FIG. 1) that consume power and a power storage apparatus 21 capable of supplying power to a power grid 30 are provided in a consumer's building 1. In other words, only the power grid 30 and the power storage apparatus 21 supply power to the electric loads 2 in the building 1. A distribution board 32 is installed in the consumer's building 1. The power grid 30, the power storage apparatus 21 and the electric loads 2 are connected to the distribution board 32.

The distribution board 32 includes; a principal circuit (not shown) that receives power from the power grid 30; and a plurality of branch circuits (not shown) that are branched from the principal circuit and constitute a plurality of systems. In other words, in the distribution board 32, an electric path is branched to form the branch circuits so as to supply power received from the power grid 30 to the electric loads 2 connected to the systems, and the distribution board 32 protects each branch circuit from an abnormal current.

A controller 16 controls: time periods during which charging and discharging of a storage battery (not shown) of the power storage apparatus 21 are performed; and the charging power and the discharging power. The storage battery of the power storage apparatus 21 is charged with power received from the power grid 30. The power storage apparatus 21 has a function to measure a residual capacity (power storage amount) of the storage battery of the power storage apparatus 21. The residual capacity of the storage battery does not need to be measured in real time, as long as at least a residual capacity at a start point of charging or discharging of the storage battery is measured. More preferably, a residual capacity at an end point of the charging or discharging is additionally measured.

The supply destination of power that is output from the power storage apparatus 21 is selected by the controller 16 switching a switch 320 that is provided in the distribution board 32. In other words, the switch 320 is controlled by the controller 16 to select any one of a first state that is to supply power from the power storage apparatus 21 to the electric loads 2 and a second state that is to supply power from the power storage apparatus 21 to the power grid 30. When the controller 16 selects the first state, power of the power storage apparatus 21 is applied to at least part of power that is needed by the electric loads 2 in the building 1, and accordingly, power to be received from the power grid 30 is reduced. On the other hand, when the controller 16 selects the second state, a reverse flow of power to the power grid 30 is performed.

The distribution board 32 is provided with a measurement device 31 that measures respective amounts of power passing through the principal circuit and the plurality of branch circuits. The measurement device 31 is housed in a casing of the distribution board 32, or in another casing at is provided separately from the distribution board 32. A value of power passing through the principal circuit may be a value measured by an electricity meter that is installed at the building 1. Respective values of power passing through the plurality of branch circuits may be values measured by measurement units that are provided separately from the distribution board 32. Regarding power passing through the principal circuit, power from the power grid 30 and power reversely flowing to the power grid 30 are measured individually.

Desirably, the measurement device 31 is an electronic electricity meter that includes: current sensors (not shown), which respectively measure currents flowing through noted circuits; and a calculator (not shown) that calculates power with regard to the noted circuits individually, based on a line voltage value of each noted circuit and a current value measured by each current sensor. The measurement device 31 of this embodiment does not necessarily measure power passing through the respective branch circuits individually, as long as it can measure at least a total amount of power consumed by the electric loads 2.

Incidentally, it is assumed in this embodiment that there is a power trade market. The power management system 10 determines a necessary condition for allowing a consumer to sell electric power in the power trade market. This necessary condition is determined based on DR information that is transmitted from an electric utility to request adjustment of received power to consumers. The DR information mentioned here means information that includes: a reduction value as a target value of a reduction in received power; and a target period during which the reduction in received power is requested to be implemented.

Consumers are normally informed of the DR information before start of the target period. In other words, the DR information is registered on the day before the target period, the morning when the target period is started or the like to a management device (e.g., a web-server) that is operated by the electric utility. Preferably, the management device informs the power management system 10 of the DR information by a push type information distribution through a telecommunication network NT, such as the Internet or a mobile telephone network. In this way the DR information registered in the management device is reported to power management systems 10 of consumers to which the electric utility wishes to request the reduction in received power. As a result, the receiver 11 acquires the DR information.

Note that, it is also assumed in this embodiment that the DR information is reported to the consumer's side when the target period starts. In this case, the target period is started immediately after the DR information is reported to the power management systems 10. In other words, it means that the target period is started without prior notification. Note that, a person may receive the DR information through a telephone or an E-mail, and provide it to the receiver 11. Alternatively, instead of a person, the receiver 11 may be configured to receive the DR information reported through a telephone or an E-mail by the management device.

In this embodiment, two conditions are defined: a condition that the electric loads 2 receive power from the power storage apparatus 21 during the target period; and a condition that power to be sold when the contract is made in the power trade market is power stored in the power storage apparatus 21.

The estimator 12 estimates, as first power information, power that is consumed by the electric loads 2 during the target period. The first power information may be a transition in power during the target period. However, it is not easy to estimate a change of power with time during the target period. Hereinafter, an amount of power that is consumed by the electric loads 2 during the target period is used as the first power information.

Also, because it is required to grasp power stored in the power storage apparatus 21, the administrator 13 manages, as second power information, power that can be output from the power storage apparatus 21. For example, a residual capacity of the power storage apparatus 21 at a date and time when the receiver 11 acquired the DR information is used as the second power information. Alternatively, the second power information may be a residual capacity of the power storage apparatus 21 at a start point of the target period. In the case where the residual capacity of the power storage apparatus 21 at the start point of the target period is used as the second power information, when the DR information is reported to the power management systems before start of the tar period, the second power information is an estimated value, and when the DR information is reported to the power management systems at the start point of the target period, the second power information is a measured value. In any case, the administrator 13 grasps a residual capacity as the present value (a measured value), of the power storage apparatus 21, and estimates a residual capacity at the start point of the target period as needed.

In order to estimate the first power information, the estimator 12 uses: history information including a transition in power consumed by the electric loads 2 in the consumer's building 1, which is stored together with a condition that has an influence on the consumption of power; and a value of power that has been consumed at a time point when the first power information is estimated. The condition that has an influence on the consumption of power includes at least the date and time season and time slot), and more preferably, further includes the weekday or the holiday, the weather condition (such as weather and air temperature) and the like. Information corresponding to those conditions can be easily obtained through a clock unit (not shown) that is provided in the power management system 10, or a telecommunication network.

As above, the estimator 12 stores the history information regarding power consumed by the electric loads 2 together with the above conditions. When the receiver 11 acquires the DR information, the estimator 12 extracts, from the history information, a condition that is similar to a condition for the target period, included in the DR information, and then estimates an amount of power which will be consumed during the target period, based on the extracted history information. In other words, the amount of power during the target period is estimated based on the expectation that, if the conditions are similar to each other, the amounts of power to be consumed by the electric loads 2 would be also similar to each other. Note that, in a case where the system obtains other information that is useful to estimate the amount of power, which will be consumed during the target period, the accuracy of estimation can be enhanced by using such the information.

As above, when the receiver 11 acquires the DR information before start of the target period, the administrator 13 estimates a residual capacity of the power storage apparatus 21 at the start point of the target period. In other words, when the receiver 11 acquires the DR information, the administrator 13 generates a plan for charging and discharging of the power storage apparatus 21 during a time period between a time point when the DR information is acquired and the start point of the target period, and then estimates a residual capacity of the power storage apparatus 21 at the start point of the target period based on this plan.

The plan for charging and discharging of the power storage apparatus 21 may be changed due to a purpose of use of the power storage apparatus 21. The power storage apparatus 21 is used for the purpose, such as saving of an electricity charge, leveling of power to be consumed, or suppressing of a maximum value of power to be consumed. Accordingly, the administrator 13 generates the plan for charging and discharging, while considering the purpose of use of the power storage apparatus 21 desired by a consumer and the use states of the electric loads 2 in the consumer's building. When the plan is generated, power that can be used for charging of the power storage apparatus 21 is determined, and accordingly; the administrator 13 can estimate an amount of power that can be stored during the time period between the time point when the DR information is acquired and the start point of the target period.

As above, by obtaining the amount of power which will be consumed during the target period and the residual capacity of the power storage apparatus 21 at the start point of the target period, it is possible to estimate also a residual capacity of the power storage apparatus 21 at an end point of the target period in consideration of the reduction value of power during the target period. The reduction value is often given as a reduction rate of a power amount during the target period, but there is also a possibility that it is given each consumer as a reduction amount of power during the target period.

The determiner 14 determines whether or not the reduction value can be achieved, based on the first power information, the second power information and the reduction value in the DR information. For example, the determiner 14 defines a reference value for a residual capacity of the power storage apparatus 21, and determines that the reduction value in the DR information is achievable, when it is estimated that a residual capacity (estimated residual capacity) of the power storage apparatus 21 at the end point of the target period is equal to or more than the reference value. Then, the determiner 14 determines that a condition for participating in the power trade market is met, when determining that the reduction value during the target period is achievable.

Power that is an object for a trade in the power trade market is power stored in the power storage apparatus 21, and accordingly, the determiner 14 offers a trade of the power stored in the power storage apparatus 21 to the market, when the condition for participating in the power trade market is met. In other words, power obtained by subtracting power corresponding to the first power information estimated by the estimator 12 from power corresponding to the second power information managed by the administrator 13 is set to the object for the power trade.

The determiner 14 communicates with a trading device 40 described later through the telecommunication network NT to offer a trade of the power to the power trade market. When it is determined that the condition for participating in the power trade market is met, an upper limit of an amount of power for the power trade (a power selling amount) is set to an amount of power, by which a residual capacity (estimated residual capacity) of the power storage apparatus 21 at the end point of the target period exceeds the reference value. The reference value is set in consideration of estimation errors of the estimator 12 and the administrator 13, and the residual capacity (estimated residual capacity) of the power storage apparatus 21 at the end point of the target period has a margin corresponding to the reference value.

By selling power stored in the power storage apparatus 21 in the power trade market, it is possible to apply the profit to part of cost spent for introduction of the power storage apparatus 21. Accordingly, it substantially leads to a reduction in the introduction cost of the power storage apparatus 21, and consumers are motivated to introduce power power storage apparatuses 21. In addition, there is a case where a pecuniary incentive is provided by the achievement of the reduction value in the DR information, and consumers are therefore also motivated to introduce power storage apparatuses 21 by this matter.

Incidentally, when the residual capacity (estimated residual capacity) at the end point of the target period is equal to or less than the reference value, the determine 14 determines that it is impossible to participate in a power trade market. When the residual capacity (estimated residual capacity) of the power storage apparatus 21 at the end point of the target period is equal to the reference value, it is possible to supply power to the electric loads 2 during the target period. However, when the residual capacity (estimated residual capacity) of the power storage apparatus 21 at the end point of the target period is less than the reference value, there may be a shortage of power for achieving the reduction value during the target period.

Accordingly, when the residual capacity (estimated residual capacity) of the power storage apparatus 21 at the end point of the target period is less than the reference value, the determiner 14 preferably prohibits supplying of power from the power storage apparatuses 21 to the electric loads 2 during the target period, or limits kinds or operations of the electric loads 2 to which power is supplied from the power storage apparatuses 21. An electric load(s) 2 to which power is allowed to be supplied from the power storage apparatuses 21 during the target period may be previously determined in accordance with importance levels, priority levels or the like, of the electric loads 2. In this case, the estimator 12 preferably estimates an amount of power to be consumed by the electric loads 2, in assuming that kinds or operations of the electric loads 2 to which power is supplied during the target period are limited. Also in the case where kinds or operations of the electric loads 2 are limited, the degree of limitation may be set by two or more steps in accordance with the importance levels, the priority levels or the like, of the electric loads 2.

When a power seller or buyer has participated in the power trade market and further made the contract for the power trade, the determiner 14 instructs the controller 16 to select the second state (i.e., the state where power is supplied from the power storage apparatuses 21 to the power grid 30). Thus, the determiner 14 instructs the controller 16 to select the second state after participating in the power trade market and making the contract for the power trade through communication with the trading device 40, thereby supplying power of the power storage apparatuses 21 to the power grid 30.

Even when the power management system 10 transmits a request for participating in the power trade market to the trading device 40, there is also a case where the power trade is not made, such as a case where trade terms of a power seller and a power buyer do not match with each other, or a case where a trade term of another power seller is more advantageous to the power buyer than that of the power seller. When the power trade is not made, the determiner 14 instructs the controller 16 to supply power of the power storage apparatuses 21 to the electric loads 2 as needed, without supplying of power from the power storage apparatuses 21 to the power grid 30. In other words, the determiner 14 instructs the controller 16 to select the second state when the power trade is made, and the first state when the power trade is not made.

Figure 2:
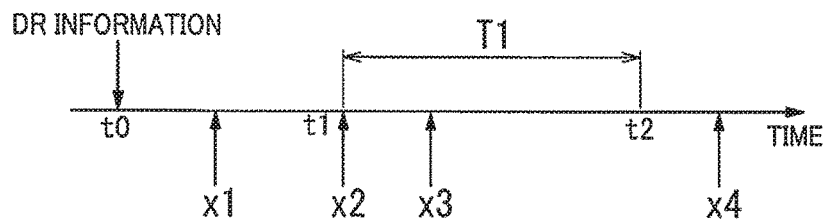
FIG. 2 is a diagram illustrating a setting example of a price for a power trade according to Embodiment 1.

Incidentally, it is considered that the determiner 14 offers a trade of power to the power trade market at any one of four timings as shown by x1 to x4 of FIG. 2, with respect to a target period T1. Note that, when the determiner 14 participates in the power trade market at the timing x4 that is set after the end of the target period T1, a residual capacity of the power storage apparatus 21 at an end point t2 of the target period T1 is known, and accordingly, this case is out of an object for the technique of this embodiment. The target period T1 may be before or after a period of performing the power trade, or overlap with all or part of the period of performing the power trade.

In FIG. 2, the timing x1 is set in a period between a time point t0 of acquiring the DR information and a start point t1 of the target period T1. The timing x2 agree with the start point t1 of the target period T1. The timing x3 is set within the target period T1. In the case of the timing x1, as described above, it is possible to increase the residual capacity of the power storage apparatus 21 before the start point t1 of the target period T1. On the other hand, in the case of the timing x2 or timing x3, it is impossible to increase the residual capacity of the power storage apparatus 21. Accordingly, the administrator 13 estimates a residual capacity of the power storage apparatus 21 at the end point of the target period T1, based on information regarding the residual capacity received from the power storage apparatus 21.

In this way, when the timing of offering the trade of power is within a period between the time point of acquiring the DR information and the end point of the target period T1, the determiner 14 can estimate the residual capacity of the power storage apparatus 21 at the end point of the target period T1. Accordingly, if in the period between the time point t0 of acquiring the DR information and the end point t2 of the target period T1, the determiner 14 can estimate that the condition will be met at the end point t2, it is possible to participate anytime in the power trade market, using the power stored in the power storage apparatus 21.

Hereinafter, the power trade will be described simply. The power trade is established when a power buyer and a power seller that can meet a demand of the power buyer exist. The power trade is performed by the power buyer and seller respectively presenting and advertising the trade terms. A device that manages the power trade market is the trading device 40, and the power trade is performed by terminal devices of the power buyer and seller respectively presenting the trade terms to the trading device 40 via the telecommunication network NT such as the Internet.

The trading device 40 searches for an equilibrium point of a demand and a supply from the trade term presented by the power buyer and the trade term presented by the power seller, and when having obtained the equilibrium point, establishes a power trade (makes a contract), and on the other hand when not having obtained the equilibrium point, establishes no power trade. The trade term mentioned here includes: an implementation period during which supplying and receiving of power are implemented; power (or an amount of power) in the implementation period; and a price of power (a unit price or a total price). The trading device 40 reports the result regarding the power trade to the terminal devices of the power buyer and seller, and when the contract for the power trade is made, also reports the trade term under which the contract is made to the terminal devices. In this embodiment, the power management system 10 corresponds to the terminal devices.

In this case, as an example of the power trade, it is assumed that each of the power buyer and seller presents the trade term having two or more steps. Regarding the implementation period included in the trade term, if the trade term presented by the power buyer overlaps with at least a part of the trade term presented by the power seller, the power trade can be performed. That is, if the implementation period demanded by the power buyer overlaps with the implementation period provided by the power seller, the power trade can be performed. Regarding the power and the price of the power of the trade term, each of the power buyer and seller presents two or more kinds of combinations. The trading device 40 sets, to the equilibrium point, a point at which the price of the trade term of the power seller agrees with that of the power buyer.

Generally, the power buyer sets a combination of the power and the price such that more power is obtained, as the price is lower, and the power seller sets a combination of the power and the price such that more power is sold, as the price is higher. Accordingly, if there is a region where a range of the price set by the power buyer partially overlaps with that set by the power seller, the trading device 40 can obtain the equilibrium point.

Figure 3:
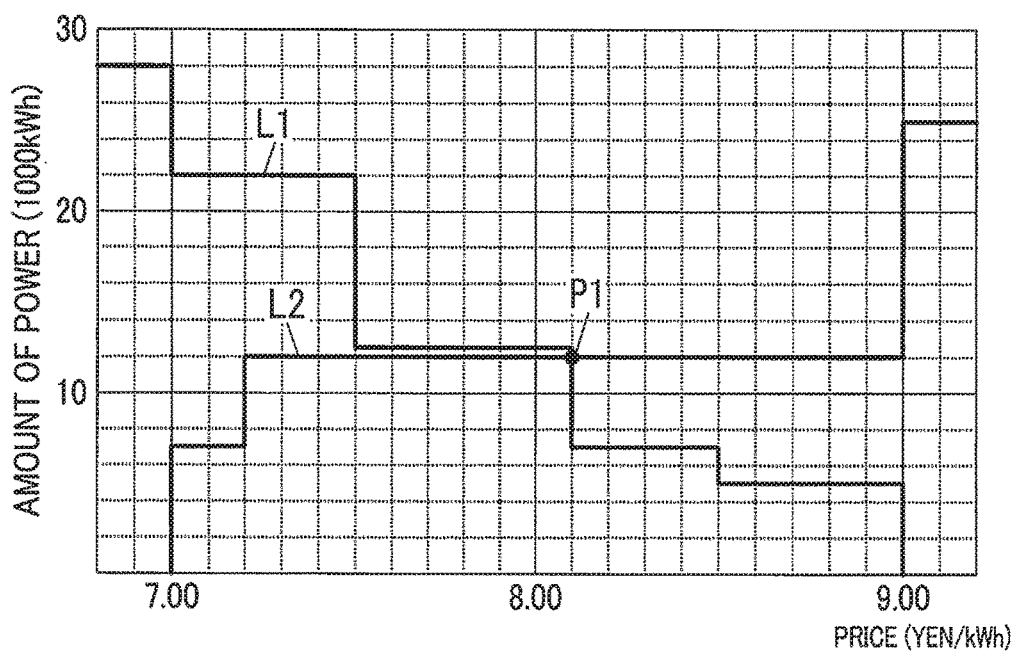
FIG. 3 is a diagram illustrating a setting example of a price according to Embodiment 1.

One example of the power trade by the trading device 40 is shown in FIG. 3. The figure shows an example where the power trade is performed, using a combination of an amount of power and a power unit price per kWh. In FIG. 3, a case is assumed where regarding the power buyer, an amount of power capable of being purchased per hour and the unit price have a relationship shown in FIG. 4A, and regarding the power seller, an amount of power capable of being sold per hour and the unit price have a relationship shown in FIG. 4B.

In the examples of FIGS. 4A and 4B, when the unit price is equal to or less than 7.00 yen, the power buyer is capable of purchasing an amount of power of 28,000 kWh, and when the unit price is more than 8.50 yen and equal to or less than 9.00 yen, the power buyer is capable of purchasing an amount of power of 5,000 kWh. When the unit price is more than 9.00 yen, the power buyer abandons the purchase of power. On the other hand, when the unit price is more than 7.00 yen and equal to or less than 7.20 yen, the power seller is capable of selling an amount of power of 7,000 kWh as an upper limit, and when the unit price is more than 9.00 yen, power seller is capable of selling an amount of power of 25,000 kWh as an upper limit. When the unit price is equal to or less than 7.00 yen, the power seller abandons the selling of power.

Hereinafter, regarding graphs of FIG. 3 each representing the relationship between the amount of power and the unit price, a graph representing the relationship of the power buyer is referred to as a demand line L1, and a graph representing the relationship of the power seller is referred to as a supply line L2. According to the graphs, a point (equilibrium point) at which the amount of power demanded by the power buyer agrees with the amount of power for the trade, which the power seller is capable of supplying, is represented by an intersection point P1 of the demand line L1 and the supply line L2. In other words, in the relationships shown in FIG. 3, the contracted amount of power is 12,000 kWh per hour, and the unit price in this case is 8.10 yen per kWh.

As above, when the equilibrium point between the power seller and buyer is obtained, the trading device 40 reports the made contract together with the established trade term to the power seller and buyer. Here when the contracted amount of power is insufficient for the power buyer, a power shortage is supplied separately. In the above example, the contracted amount of power is 12,000 kWh per hour, and when the power buyer needs 13,000 kWh per hour, a power shortage of 1000 kWh is generated and accordingly, this shortage is supplied separately.

The above-mentioned trade is one example, and because it is assumed that more participants actually exist, the number of combinations for making the contract may become huge. For this reason, it is preferable that an appropriate combination be extracted by an algorithm capable of obtaining a relatively good solution in a finite time period, such as a probabilistic algorithm or a genetic algorithm.

Also in the above-mentioned example, the demand line L1 and the supply line L2 are denoted by discontinuous lines in combination of straight lines, but may be denoted by smoothly continuous curved lines. The relationship between the demand line L1 and the supply line L2 is variously set in accordance with environment conditions of the power buyer and seller. The environment condition mentioned here means a financial resource, an urgency level of a power demand or the like, of the power buyer or the power seller.

In the above configuration example of the power management system 10, the receiver 11, the estimator 12, the administrator 13 and the controller 16 can be installed in the building 1. However, the elements other than the controller 16 may be installed separately from the building 1. When the elements other than the controller 16 are installed separately from the building 1, the power management system 10 may be realized using a web-server or a cloud computing system.

In this case, it is preferable that a communication interface be provided in the building 1 in order to transfer a residual capacity of the storage battery measured by the power storage apparatus 21 to the administrator 13, and transfer a value of power measured by the measurement device 31 to the estimator 12. Also it is probable that a communication interface be provided in the building 1 such that the determiner 14 reports to the controller 16 whether or not the contract is made.

In other words, with the communication interface being provided in the building 1, the building 1 can receive the service provided by the trading device 40 without installing the receiver 11, the estimator 12, the administrator 13 and the determiner 14 in the building 1.

Note that in the above-mentioned embodiment, a configuration that the power storage apparatus 21 is installed in the building 1 is assumed. However, the storage battery of the power storage apparatus 21 may be a storage battery mounted in an electric vehicle. The supply destination of power from the power storage apparatus 21 may be finally determined to be the electric loads 2 or the power grid 30 in consideration of another condition.

Embodiment 2

In this embodiment, as shown in FIG. 5, a case will be described, where a photovoltaic power generation apparatus 22 is installed as a power supplying apparatus 20 in a building 1 in addition to a power storage apparatus 21. The photovoltaic power generation apparatus 22 does not need a consideration of charging, unlike the power storage apparatus 21. On the other hand, power generated by the photovoltaic power generation apparatus 22 is not constant. That is, power that can be output changes every moment, depending on a temperature, and intensity, an incident angle a wavelength component and the like of light that is incident on a solar cell constituting the photovoltaic power generation apparatus 22. Also, the photovoltaic power generation apparatus 22 is not configured to output a fixed voltage, but configured such that an output voltage thereof follows a line voltage of electric lines connected to the photovoltaic power generation apparatus 22. In other words, when the generated power is changed while power is received from the power grid 30, the output voltage of the photovoltaic power generation apparatus 22 is kept at the voltage of the power grid 30, and a current is changed so as to follow the change in the power.

Power to be generated by the photovoltaic power generation apparatus 22 is estimated based on the weather, air temperature and the like. An administrator 13 of this embodiment has a function that estimates the power to be generated by the photovoltaic power generation apparatus 22. The administrator 13 has a function that acquires information regarding power generated by the photovoltaic power generation apparatus 22 from a sensor (not shown) (that monitors a current and a voltage, similarly to a measurement device 31), and stores a transition in power of the acquired information together with a date and time. Because the information stored in the administrator 13 is used for estimating an amount of power to be generated by the photovoltaic power generation apparatus 22, it is preferable that the administrator 13 also store another condition of contributing to the amount of power to be generated by the photovoltaic power generation apparatus 22, in addition to the date and time. This type of condition includes an amount of solar radiation, air temperature, the season and the like.

The administrator 13 estimates an amount of power, which will be generated by the photovoltaic power generation apparatus 22 during a target period, based on the past change (history) in power that is stored, information regarding a weather report (in particular, weather and air temperature), and the like. The information regarding the amount of power estimated by the administrator 13 is used for estimating a residual capacity of the power storage apparatus 21. In this case, the administrator 13 estimates a residual capacity of the power storage apparatus 21 at an end point of the target period, additionally based on a condition of supplying, to the electric loads 2, power generated by the photovoltaic power generation apparatus 22 prior to power output from the power storage apparatus 21 during the target period.

In other words, the following condition is set: if possible, the power generated by the photovoltaic power generation apparatus 22 is supplied to the electric loads 2 during the target period, and when an amount of power generated by the photovoltaic power generation apparatus 22 is insufficient for an amount of power needed by the electric loads 2, the power storage apparatus 21 supplies power to the electric loads 2. Under this condition, the administrator 13 estimates the residual capacity of the power storage apparatus 21 at the end point of the target period. With this configuration, the residual capacity of the power storage apparatus 21 at the end point of the target period becomes more than that of Embodiment 1 with a high possibility.

As found from the above configuration, the administrator 13 manages, before the target period, a total of a residual capacity of the power storage apparatus 21 at a start point of the target period and an amount of power that is generated during the target period by the photovoltaic power generation apparatus 22, as second power information. Accordingly, the determiner 14 estimates a residual capacity of the power storage apparatus 21 at the end point of the target period, on an assumption that a reduction value is achieved during the target period, based on first power information and the second power information.

Therefore, compared with the configuration described in Embodiment 1, an opportunity to participate in a power trade market is more increased, and an amount of power that can be provided for a power trade is also more increased. In other words, a price obtained by the power trade is increased, and accordingly, it is possible to shorten a recovery period of cost spent for introduction of the power storage apparatus 21 and the photovoltaic power generation apparatus 22. When during the target period an amount of power generated by the photovoltaic power generation apparatus 22 is more than an amount of power needed by the electric loads 2 and further the power storage apparatus 21 is not in a fully charged state, a surplus of the amount of power generated by the photovoltaic power generation apparatus 22 can be used for charging the power storage apparatus 21. In this case, the residual capacity of the power storage apparatus 21 at the end point of the target period is further increased.

The other constituents and operations of this embodiment are similar to those of Embodiment 1. In this embodiment, since not only the power storage apparatus 21 but also the photovoltaic power generation apparatus 22 are used as the power supplying apparatus 20, power available during the target period is increased, and accordingly, the residual capacity of the power storage apparatus 21 at the end point of the target period can be expected to be increased. In other words, an opportunity that participation in the power trade market is allowed is increased. In addition, because the photovoltaic power generation apparatus 22 generates power using natural energy, a cost of power generation does not occur, and accordingly, it is possible to expect an increase in the profit when the contract for the power trade is made. Note that, as described above, the photovoltaic power generation apparatus 22 in this embodiment may be replaced with another power generation apparatus that generates power using natural energy such as wind, hydro or geothermal energy.

The above configuration example is to determine whether to participate in the power trade market or not, based on the residual capacity of the power storage apparatus 21 and the assumption that the reduction value in the DR information is achieved. However, whether to participate in the power trade market or not may be determined based on estimated profit, which a consumer will obtain. In this case, profit in a case where power to be received by the consumer's building 1 is reduced based on the DR information is compared with profit in a case where power stored in the power storage apparatus 21 is sold in the power trade market, ignoring the DR information. Here an operation for achieving the reduction value in the DR information during the target period is defined as a first operation mode, and an operation for offering a trade of power corresponding to the second power information during the target period to the power trade market is defined as a second operation mode. A selector 15 provided in the power management system 10 selects any one of the first and second operation modes.

The selector 15 compares profit (first profit) be obtained by selection of the first operation mode with profit (second profit) which will be obtained by selection of the second operation mode, and selects a mode of providing larger profit from those modes.

The first profit is profit that is estimated, which will be obtained by offering a trade of power to the power trade market according to the DR information, as described above. The first profit may include a pecuniary incentive that is given the consumer from an electric utility by the implementation of the DR information.

On the other hand, the second profit is profit which the consumer will obtain if selling power other than power to be consumed by the electric loads 2 in the power trade market without using the power storage apparatus 21 during the target period for a reduction in power to be received by the consumer's building 1. In other words, the second profit is calculated in the second operation mode by the balance of the account between: revenue that is obtained by selling power in the power trade market; and loss that is caused due to a penalty occurring by ignoring the DR information, namely, by not reducing received power.

The selector 15 compares the calculated first and second profits, and selects a mode of providing lamer profit from the first and second operation modes. Note that, it is impossible to completely estimate the revenue that is obtained by offering a trade of power in the power trade market, but an expectation value may be used, which is calculated in consideration of conditions such as a case where the contract is made, or not, and a case where a purchase price is high, or low.

Although the present invention has been described with reference to certain preferred embodiments, numerous modifications and variations can be made by those skilled in the art without departing from the true spirit and scope of this invention, namely claims.

The invention claimed is:
1. A power management system, comprising:
at least one processor;
at least one memory communicatively coupled to the at least one processor;
a switch; and
a controller,
wherein the at least one processor is configured to:
  acquire DR information that includes a reduction value and a target period for requesting a reduction of received power;
  estimate, as first power information, power that is consumed by an electric load during the target period;
  manage, as second power information, power that can be output from a power supplying apparatus including a power storage apparatus; and
  communicate with a trading device managing a power trade market to transmit information relating to a power trade, when determining that the reduction value is achievable during the target period, in response to the first power information and the second power information,
wherein the switch is configured to select any one of a first state that is to supply power from the power storage apparatus to the electric load and a second state that is to supply power from the power storage apparatus to a power grid, and
the controller is configured to control the switch to select the first state when the power trade is not made, and to select the second state when the power trade is made,
wherein the at least one processor is further configured to:
manage, as the second power information, a residual capacity of the power storage apparatus; and
transmit, to the trading device, the information relating to power obtained by subtracting power corresponding to the first power information from power corresponding to the second power information, when determining that the reduction value is achievable during the target period,
estimate, before the target period, a residual capacity of the power storage apparatus at a start point of the target period, as the second power information;
estimate a residual capacity of the power storage apparatus at an end point of the target period, on an assumption that the reduction value is achieved during the target period, based on the first power information and the second power information; and
when the residual capacity estimated at the end point of the target period exceeds a reference value, transmit, to the trading device, the information relating to power by which the power corresponding to the second power information exceeds the reference value.

2. The power management system according to claim 1, wherein:
the power supplying apparatus includes a power generation apparatus that generates power using natural energy and supplies, to the electric load, generated power prior to power output from the power storage apparatus; and
the second power information includes power that is generated during the target period by the power generation apparatus.

3. The power management system according to claim 2, wherein the at least one processor is further configured to:
manage, before the target period, a total of a residual capacity of the power storage apparatus at a start point of the target period and an amount of power that is generated during the target period by the power generation apparatus, as the second power information;
estimate a residual capacity of the power storage apparatus at an end point of the target period on an assumption that the reduction value is achieved during the target period, based on the first power information and the second power information; and when the residual capacity estimated at the end point of the target period exceeds a reference value, transmit, to the trading device, the information relating to power by which the power corresponding to the second power information exceeds the reference value.

4. A power management method, comprising:
acquiring DR information that includes a reduction value and a target period for requesting a reduction of received power;
estimating, as first power information, power that is consumed by an electric load during the target period;
communicating with a trading device managing a power trade market to transmit information relating to a power trade, when determining that the reduction value is achievable during the target period, in response to the first power information;
selecting, with a switch, any one of a first state that is to supply power from a power storage apparatus to the electric load and a second state that is to supply power from the power storage apparatus to a power grid; and
controlling, with a controller, the switch to select the first state when the power trade is not made, and to select the second state when the power trade is made,
managing, as the second power information, a residual capacity of the power storage apparatus; and
transmitting, to the trading device, the information relating to power obtained by subtracting power corresponding to the first power information from power corresponding to the second power information, when determining that the reduction value is achievable during the target period,
estimating, before the target period, a residual capacity of the power storage apparatus at a start point of the target period, as the second power information;
estimating a residual capacity of the power storage apparatus at an end point of the target period, on an assumption that the reduction value is achieved during the target period, based on the first power information and the second power information; and
when the residual capacity estimated at the end point of the target period exceeds a reference value, transmitting, to the trading device, the information relating to power by which the power corresponding to the second power information exceeds the reference value.

5. A non-transitory computer-readable recording medium having stored thereon a computer program which, upon execution by a computing system, causes the computing system to perform a method comprising:
acquiring DR information that includes a reduction value and a target period for requesting a reduction of received power;
estimating, as first power information, power that is consumed by an electric load during the target period;
communicating with a trading device managing a power trade market to transmit information relating to a power trade, when determining that the reduction value is achievable during the target period, in response to the first power information;
selecting any one of a first state that is to supply power from a power storage apparatus to the electric load and a second state that is to supply power from the power storage apparatus to a power grid; and
controlling to select the first state when the power trade is not made, and to select the second state when the power trade is made,
managing, as the second power information, a residual capacity of the power storage apparatus; and
transmitting to the trading device, the information relating to power obtained by subtracting power corresponding to the first power information from power corresponding to the second power information, when determining that the reduction value is achievable during the target period,
estimating, before the target period, a residual capacity of the power storage apparatus at a start point of the target period, as the second power information;
estimating a residual capacity of the power storage apparatus at an end point of the target period, on an assumption that the reduction value is achieved during the target period, based on the first power information and the second power information; and
when the residual capacity estimated at the end point of the target period exceeds a reference value, transmitting, to the trading device, the information relating to power by which the power corresponding to the second power information exceeds the reference value.

6. A power management system, comprising:
at least one processor;
at least one memory communicatively coupled to the at least one processor;
a switch; and
a controller,
wherein the at least one processor is configured to:
acquire DR information that includes a reduction value and a target period for requesting a reduction of received power;
estimate, as first power information, power that is consumed by an electric load during the target period;
manage, as second power information, power that can be output from a power supplying apparatus including a power storage apparatus; and
communicate with a trading device managing a power trade market to transmit information relating to a power trade, when determining that the reduction value is achievable during the target period, in response to the first power information and the second power information;
wherein the switch is configured to select any one of a first state that is to supply power from the power storage apparatus to the electric load and a second state that is to supply power from the power storage apparatus to a power grid, and
the controller is configured to control the switch to select the first state when the power trade is not made, and to select the second state when the power trade is made,
wherein:
the power supplying apparatus includes a power generation apparatus that generates power using natural energy and supplies, to the electric load, generated power prior to power output from the power storage apparatus; and
the second power information includes power that is generated during the target period by the power generation apparatus,
wherein the at least one processor is further configured to:
manage, before the target period, a total of a residual capacity of the power storage apparatus at a start point of the target period and an amount of power that is generated during the target period by the power generation apparatus, as the second power information;
estimate a residual capacity of the power storage apparatus at an end point of the target period on an assumption that the reduction value is achieved during the target period, based on the first power information and the second power information, and when the residual capacity estimated at the end point of the target period exceeds a reference value, transmit, to the trading device, the information relating to power by which the power corresponding to the second power information exceeds the reference value.

7. A power management method, comprising:

acquiring DR information that includes a reduction value and a target period for requesting a reduction of received power;

estimating, as first power information, power that is consumed by an electric load during the target period;

communicating with a trading device managing a power trade market to transmit information relating to a power trade, when determining that the reduction value is achievable during the target period, in response to the first power information;

selecting, with a switch, any one of a first state that is to supply power from the power storage apparatus to the electric load and a second state that is to supply power from the power storage apparatus to a power grid; and controlling, with a controller, the switch to select the first state when the power trade is not made, and to select the second state when the power trade is made, wherein:

the power supplying apparatus includes a power generation apparatus that generates power using natural energy and supplies, to the electric load, generated power prior to power output from the power storage apparatus; and the second power information includes power that is generated during the target period by the power generation apparatus, wherein the power management method further comprising:

managing, before the target period, a total of a residual capacity of the power storage apparatus at a start point of the target period and an amount of power that is generated during the target period by the power generation apparatus, as the second power information;

estimating a residual capacity of the power storage apparatus at an end point of the target period on an assumption that the reduction value is achieved during the target period, based on the first power information and the second power information, and when the residual capacity estimated at the end point of the target period exceeds a reference value, transmitting, to the trading device, the information relating to power by which the power corresponding to the second power information exceeds the reference value.

8. A non-transitory computer-readable recording medium having stored thereon a computer program which, upon execution by a computing system, causes the computing system to perform a method comprising:

acquiring DR information that includes a reduction value and a target period for requesting a reduction of received power;

estimating, as first power information, power that is consumed by an electric load during the target period;

communicating with a trading device managing a power trade market to transmit information relating to a power trade, when determining that the reduction value is achievable during the target period, in response to the first power information;

selecting any one of a first state that is to supply power from the power storage apparatus to the electric load and a second state that is to supply power from the power storage apparatus to a power grid; and controlling to select the first state when the power trade is not made, and to select the second state when the power trade is made, wherein:

the power supplying apparatus includes a power generation apparatus that generates power using natural energy and supplies, to the electric load, generated power prior to power output from the power storage apparatus; and the second power information includes power that is generated during the target period by the power generation apparatus, wherein the power management method further comprising:

managing, before the target period, a total of a residual capacity of the power storage apparatus at a start point of the target period and an amount of power that is generated during the target period by the power generation apparatus, as the second power information;

estimating a residual capacity of the power storage apparatus at an end point of the target period on an assumption that the reduction value is achieved during the target period, based on the first power information and the second power information, and when the residual capacity estimated at the end point of the target period exceeds a reference value, transmitting, to the trading device, the information relating to power by which the power corresponding to the second power information exceeds the reference value.

* * * * *